Figures 1, 2:
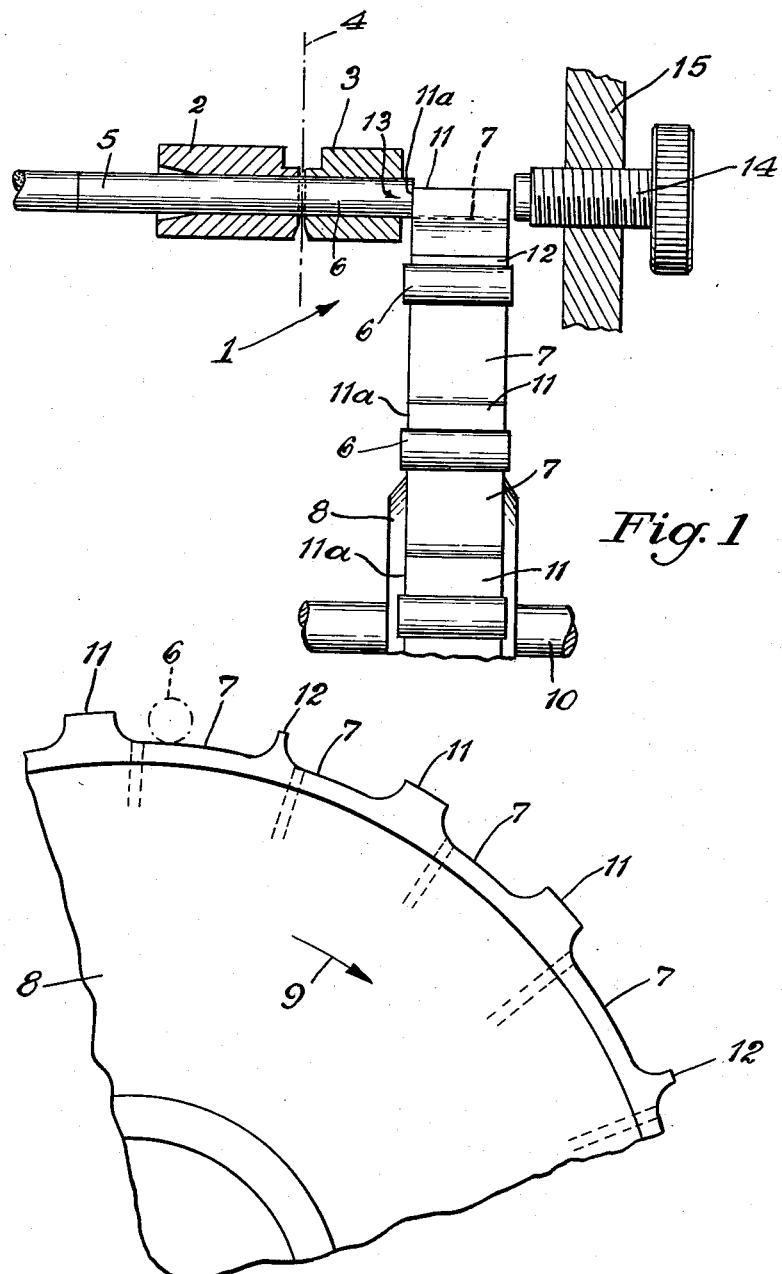

United States Patent Office 2,840,164
Patented June 24, 1958

2,840,164

DEVICE FOR CUTTING CIGARETTE FILTER RODS

Willy Rudszinat, Hamburg-Bergedorf, Germany, assignor to Kurt Korber & Co. K. G., Hamburg-Bergedorf, Germany Application August 29, 1956, Serial No. 606,830

Claims priority, application Germany September 8, 1955

4 Claims. (Cl. 164—59)

This invention relates to cutting devices in general, and more particularly to cutting devices for cutting filter rods into filter tip sections in the manufacture of filter tip cigarettes.

A general object of the present invention is to provide an improved and more efficient cutting device for cutting filter rods into sections for subsequent use in filter tip cigarette machines.

It is known in the art to provide devices for cutting filter rods into axial sections, the latter being placed in the grooves of a supporting conveying drum. The filter rods are of a length equal to several filter tip sections. As known, each filter tip section has a length equal to two finished filter tips. The filter rods are continuously conveyed one after the other against an abutment. The filter rods are moved through two spaced guide tubes and are cut through between the guide tubes. Former practice has been to position the two guide tubes in such manner relative ot the filter body conveying drum that the cutting point between the guide tubes is spaced from the abutment a distance equal to the length of two filter tip sections. As already mentioned, each filter tip section is twice the length of a finished filter tip. As a result, in the operation of such devices a cut filter tip section will necessarily serve as a measuring distance for the following filter tip section of double finished length.

A disadvantage of such a device of the prior art is that at the start of operation of such a machine, the already cut filter section, used for measuring, and normally, during operation of the machine, disposed in the groove of the filter body conveying drum, will be missing. As a substitute for this filter section of double useful length, the abutment itself was previously used. For this purpose the abutment was manually operated at two separate positions. The first position was at the point at which the abutment was moved forward to provide a necessary abutment for cutting the first filter tip section in starting the machine. The second position was the point at which the abutment was retracted to its operating position during subsequent normal operation of the machine, after the first cut had been made in the advanced position.

It must be admitted that after the abutment was properly adjusted for the normal operation, the operation of the machine was relatively simple, but it was very disadvantageous during the starting of the machine that the same had to be operated by hand in cutting off the first filter tip section of double finished length. After the abutment was manually retracted to its normal operating position, the machine could then be operated in the usual manner.

A further disadvantage of the known arrangement was that in those cases in which rather soft filter tip material was used, due to the axial compression of the material of the filter rods, variations in the lengths of the filter tip sections were obtained. This resulted since, in adjusting the length of the filter tip section, actually the length of two such filter tip sections was used, namely the length of the distance between the abutment in its normal operating position and the cutting-off point.

In order to eliminate the foregoing disadvantages, and to be able to immediately start up the machine without delay, the present invention provides the elimination of the adjustable abutment and substitutes therefor the side surfaces of the ridges between the grooves of the filter body conveyor drum, which face the guiding tubes. The filter rods are pushed in the direction of the filter body carrying drum until they reach the side surfaces of the respective ridges, after which the first filter tip section is cut off between the two guiding tubes. During the process of cutting through the filter rod, the side surface of the respetcive ridge moves along the end surface of the respective filter rod, due to the continuous rotation of the filter tip section conveying drum. Subsequently, following the completion of the cutting action, the following groove of the conveyor drum appears for reception of the cut filter tip section, which is pushed out of the guiding tube by the following filter rod. According to the present invention, therefore, only a single filter tip section is used for the determination of the cutting length, so that where very soft filter tip material is used variations in length will be eliminated.

It is, consequently, a further object of the present invention to provide an improved cutting device utilizing a filter tip section conveying drum, whereby the side surfaces of ridges provided on said drum are employed as abutment means for the accurate determination of the cutting length of the filter tip section.

Further objects and advantages will readily become apparent upon reading the following specification, taken in conjunction with the drawing, in which:

Fig. 1 is a fragmentary side elevational view, partially in section, of a filter rod cutting device embodying the principles of the present invention; and, Fig. 2 shows an end view of a fragmentary portion of the periphery of the filter tip section conveying drum.

Referring to the drawing, and more particularly to Fig. 1 thereof, the reference numeral 1 generally designates a cutting device for filter rods. The cutting device 1 includes a pair of spaced guiding tubes 2, 3, between which, along the dot-dash line 4 appropriate cutting action takes place. More specifically, a filter rod 5 is cut through along the cutting line 4 to form a filter tip section, or filter body 6 of double finished length.

The filter body is the npushed into one of a plurality of grooves, or recesses 7 provided along the periphery of a filter body carrying drum 8. These filter bodies, or filter tip sections 6 are carried by the grooves 7 of the conveyor drum 8 to further operating positions, for instance, to a second grooved drum, not shown, where they are deposited between pairs of cigarette lengths, as well known in the art.

It will be noted that the filter tip section conveyor drum 8 rotates continuously in the direction of the arrow 9 (Fig. 2) around its axis 10, shown in Fig. 1. The grooves or notches 7 along the circumference of the drum 8 are arranged, in relation to broad ridges 11 and narrow ridges 12, such that a narrow ridge 12 follows after two broad ridges 11. The side surfaces 11a of the widened ridges 11 facing the guiding tube 3 serve, according to the invention, as an abutment means, generally designated by the reference numeral 13, for the filter rod 5 during the cutting-off process.

An abutment 14, provided upon a machine support 15, is used for arresting the axial motion of the filter bodies 6, which are pushed into the respective grooves 7 of the conveyor drum 8. Thus the abutment 14 prevents the filter tip sections, or filter bodies 6 from falling out the other ends of the respective grooves 7.

The operation of the cutting device 1, according to the invention, is as follows: By continuous rotation of the filter body conveying drum 8 in the direction of the arrow 9 (Fig. 2), the front face 11a of the first of the two widened ridges 11 comes into position in front of the guiding tube 3. The filter rod 5 thus abuts against this side surface 11a for the cutting off of the first filter tip section, or filter body 6. During the time that the front face 11a of the first broad ridge 11 is in front of the guiding tube 3, a suitable cutting knife, not shown, passing through the cutting line 4 cuts off the first filter tip body 6. When the cutting process is completed, the said front face 11a passes by to open the following groove 7 of the conveyor drum 8, and the severed filter tip section 6 will be pushed by the subsequent filter rod 5 into this accommodating groove 7 until the first filter tip section 6 strikes the abutment 14. As a result, this first cut filter body 6 is carried by the following broad ridge 11 of the filter body carrying drum 8.

The cutting off process of the second filter body, or filter tip section 6 takes place during the time when the second filter body 6 abuts the front surface 11a of the second widened ridge 11. Since the third filter body 6 represents the end of the filter rod 5, the same need not be cut off, and the third following ridge 12 of the conveyor drum 8 is not widened, so that the third filter tip section 6 is directly pushed toward the arresting abutment 14 until it reaches the same. The cutting off of the following filter rods 5 is then carried out in like manner to that described above.

From the foregoing it can be seen that when starting the machine, care need only be exercised in positioning the side surface 11a of the first of the two widened ridges 11 in front of the guiding tube 3. The machine can then be started without any additional measures being necessary.

From the foregoing description it will be apparent that I have provided an improved cutting device for filter rods 5, wherein each filter tip section 6 determines its own length, and wherein no delay is incurred in starting up the machine. The abutment 14 of my device need not be touched, whereas in the prior art devices an abutment had to be moved to two positions in starting the machine. The cutting device of my invention is accurate, eliminating variations in the filter body length, which variations are a constant source of trouble in subsequent operations.

Although I have shown and described a single cutting device embodying the principles of the invention, it is to be understood that the same was for the purpose of illustration, and that changes and modifications will readily occur to those skilled in the art without departing from the spirit and scope of the invention.

I claim as my invention:

1. A cutting device for cutting cigarette filter rods into filter tip sections of double finished length, including a rotatable filter tip section conveying drum, said conveying drum having on its circumference a plurality of axially extending grooves spaced by axially extending ridges, guiding means for guiding a filter rod axially against an end face of said drum and against an end face of one of said ridges, and cutting means associated with said guiding means for cutting a filter rod after it has been moved against one of said end faces of said ridges.

2. A cutting device for cutting cigarette filter rods into filter tip sections of double finished length, including a rotatable filter tip section conveying drum, a plurality of recesses on the periphery of said conveyor drum spaced by ridges, abutment means formed integrally with said conveyor drum and consisting of one end face of said ridges on the drum, guiding means for guiding a filter rod axially against one end face of said ridges, said end face arresting the axial motion of the filter rod, and cutting means for cutting the filter rod after it has been arrested by said abutment means.

3. A cutting device for cutting cigarette filter rods into filter tip sections of double finished length, including a rotatable filter tip section conveying drum, said conveying drum having a plurality of grooves spaced by broad ridges and narrow ridges, guiding means for guiding a filter rod axially against the end face of said broad ridges, and cutting means associated with said guiding means for cutting a filter rod after it has been arrested against said end face of said broad ridges.

4. A cutting device for cutting cigarette filter rods into filter tip sections, the filter rods being of length equal to an integral number of filter tip sections, said device including a rotatable filter tip section conveying drum having on its circumference a plurality of circumferentially spaced grooves spaced by broad and narrow ridges, the broad and narrow ridges being so arranged that a narrow ridge follows said integral number less one broad ridge in repetitive order, guiding means for guiding a filter rod axially against the end face of said broad ridges, and cutting means for cutting the filter rod after the same has been moved against the end face of each one of said broad ridges.

References Cited in the file of this patent

UNITED STATES PATENTS

| 2,509,602 | Maquat | May 30, 1950 |
| 2,712,800 | Harris | July 12, 1955 |

FOREIGN PATENTS

| 940,699 | Germany | Mar. 22, 1956 |